Figure 1:
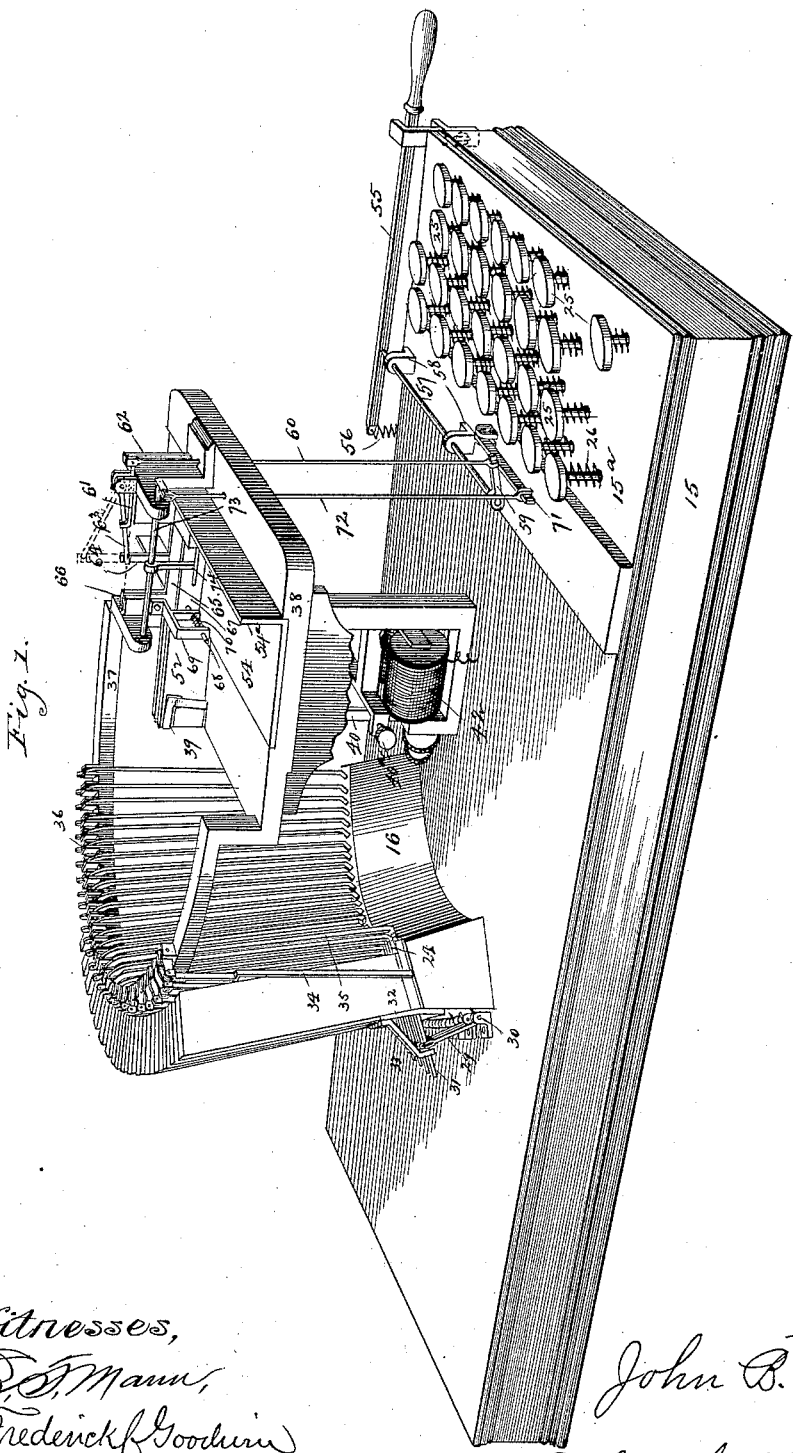

(No Model.) 7 Sheets—Sheet 1.

J. B. ODELL.
TYPE SETTING MACHINE.

No. 418,321. Patented Dec. 31, 1889.

Witnesses,
E. F. Mann,
Frederick F. Goodwin

Inventor
John B. Odell
By, Offield & Towle Attys.

(No Model.)  
7 Sheets—Sheet 3.

J. B. ODELL.
TYPE SETTING MACHINE.

No. 418,321.  Patented Dec. 31, 1889.

Witnesses,  
L. F. Mann,  
Frederick F. Goodwin

Inventor,  
John B. Odell  
By, Offield & Towle  
Attys.

(No Model.)  
7 Sheets—Sheet 4.

J. B. ODELL.
TYPE SETTING MACHINE.

No. 418,321. Patented Dec. 31, 1889.

(No Model.)

7 Sheets—Sheet 5.

J. B. ODELL.
TYPE SETTING MACHINE.

No. 418,321. Patented Dec. 31, 1889.

Witnesses,
J. S. Mann,
Frederick G. Goodwin

Inventor
John B. Odell
By, Offield & Towle
Atty's.

(No Model.) 7 Sheets—Sheet 6.

J. B. ODELL.
TYPE SETTING MACHINE.

No. 418,321. Patented Dec. 31, 1889.

Witnesses,
J. F. Mann,
Frederick F. Goodwin

Inventor,
John B. Odell
By Offield & Towle
Attys.

(No Model.) 7 Sheets—Sheet 7.
J. B. ODELL.
TYPE SETTING MACHINE.
No. 418,321. Patented Dec. 31, 1889.
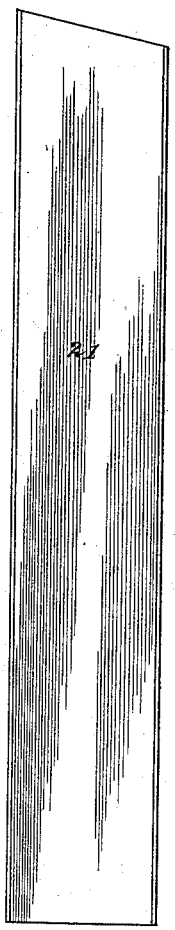
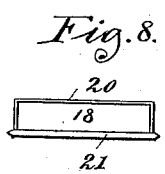
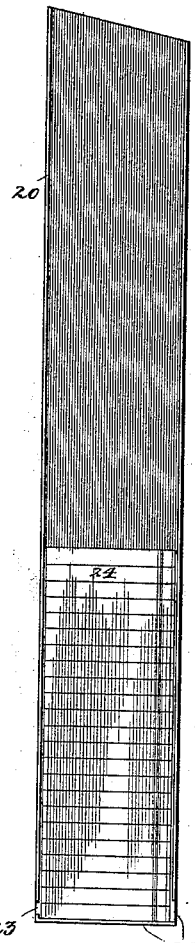
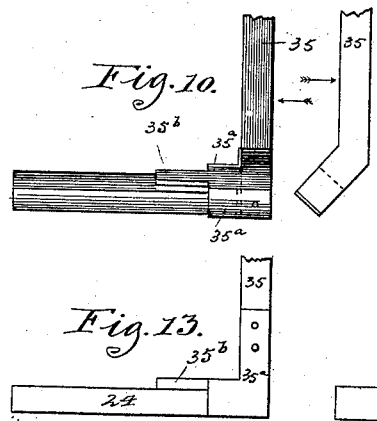
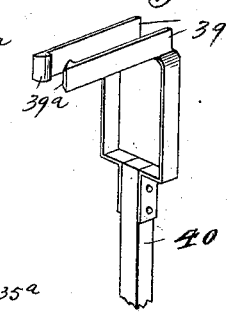
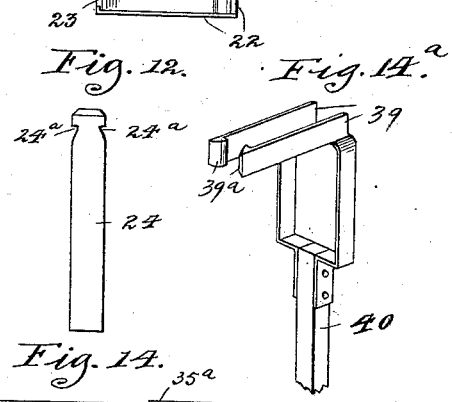
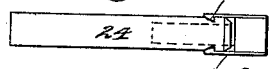
Witnesses,
L. F. Mann,
Frederick Goodwin
Inventor,
John B. Odell
By Offield & Towle Atty.
N. PETERS, Photo-Lithographer, Washington, D. C.

UNITED STATES PATENT OFFICE.

JOHN B. ODELL, OF CHICAGO, ILLINOIS, ASSIGNOR OF TWO-THIRDS TO HORATIO N. MAY AND NATHANIEL S. JONES, OF SAME PLACE.

TYPE-SETTING MACHINE.

SPECIFICATION forming part of Letters Patent No. 418,321, dated December 31, 1889.

Application filed February 4, 1889. Serial No. 298,599. (No model.)

*To all whom it may concern:*

Be it known that I, JOHN B. ODELL, a citizen of the United States, residing at Chicago, in the county of Cook and State of Illinois, have invented certain new and useful Improvements in Type-Setting Machines, of which the following is a specification.

The invention has for its object to provide a machine capable of rapidly and accurately setting up type in lines and forming the lines into columns. I prefer to embody in the machine certain mechanical devices for holding, selecting, and transferring the type, and in connection therewith certain electrical devices for handling the type. Said mechanical devices comprise a series of type-holding boxes or compartments concentrically arranged about an assembling or composing table, and in which the types are placed and fed downward by gravity, a series of operating-keys corresponding in number to the type-holding boxes, levers connecting the operating-keys with plungers adapted to force the type one at a time from the compartments onto a table and into position to be grasped by carrying-levers armed with spring gripping-jaws, which seize the types and present them to an electrically-operated type-carrying device, which sets the type in proper position in line, the setting of each type affecting the moving of the line endwise a distance equal to the thickness of such type, and means whereby the lines are assembled in columns, each line being moved a distance equal to its width prior to the formation of a new line.

Figure 2:
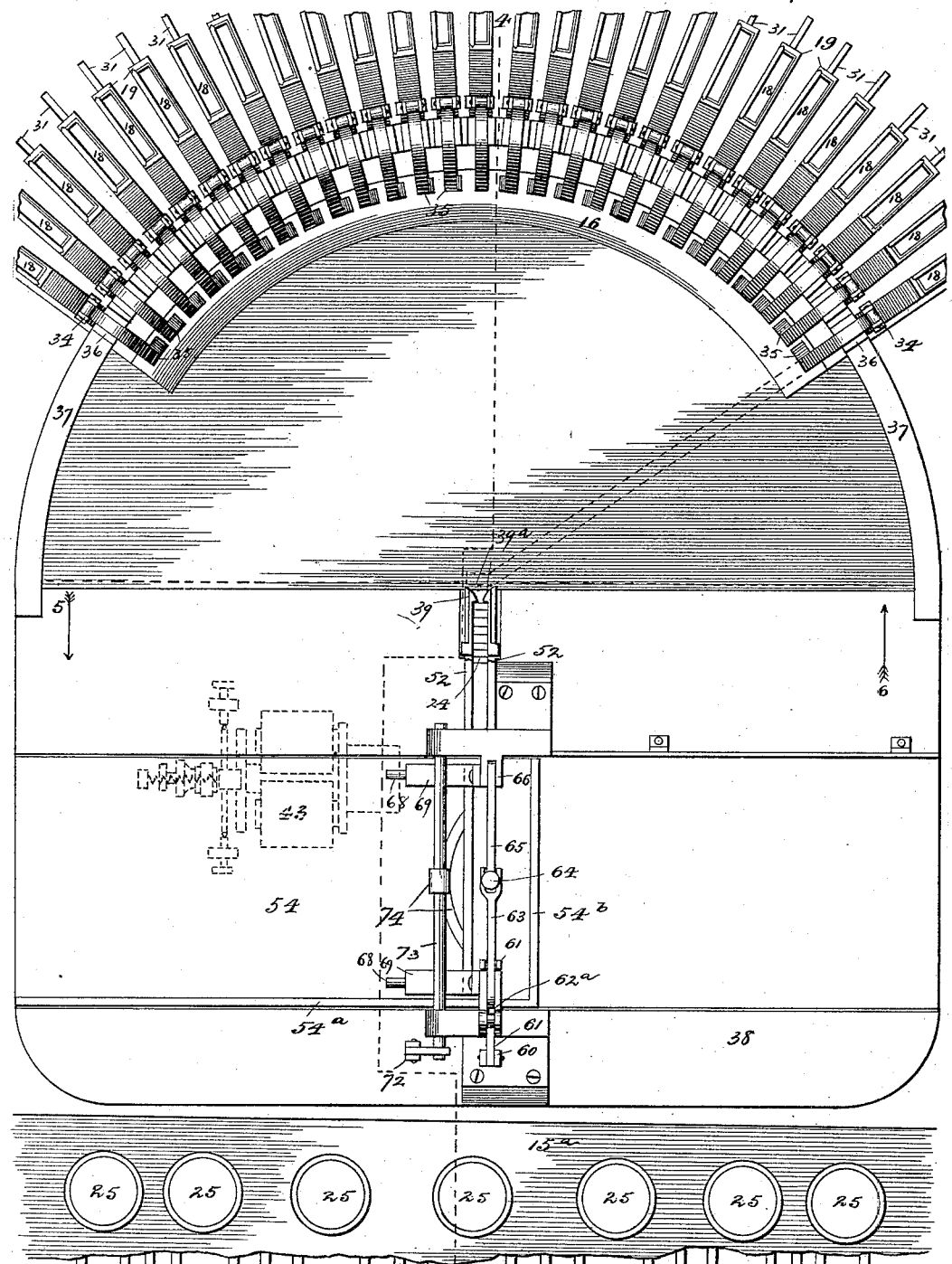
Figure 3:
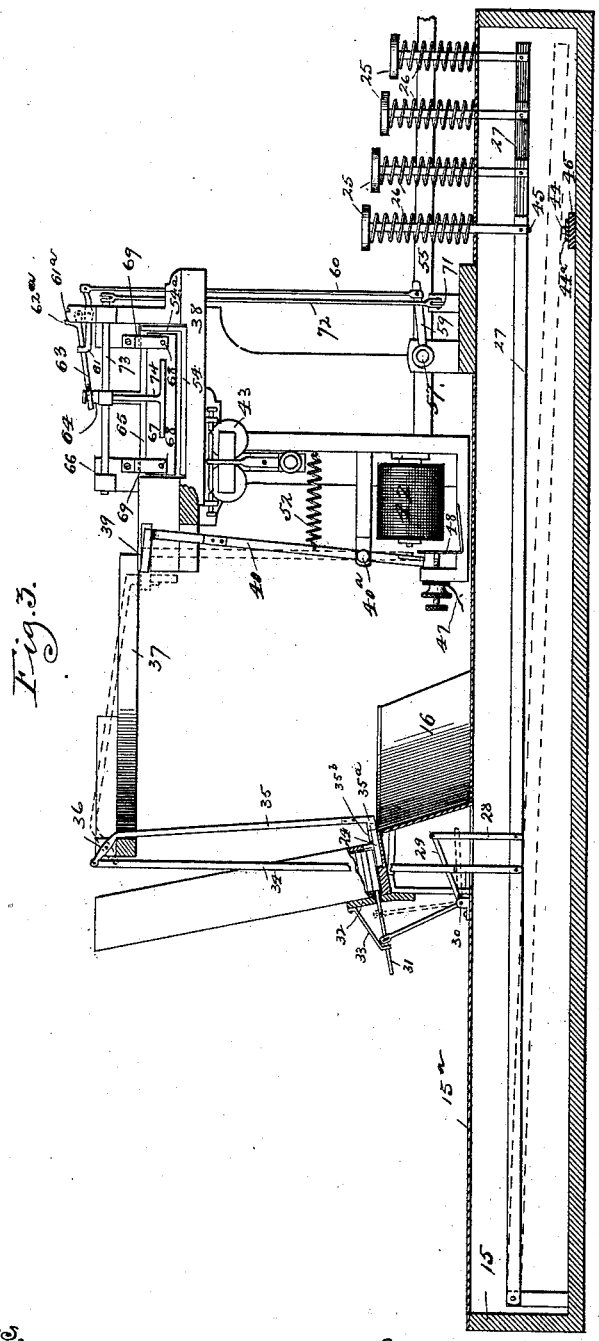
Figure 4:
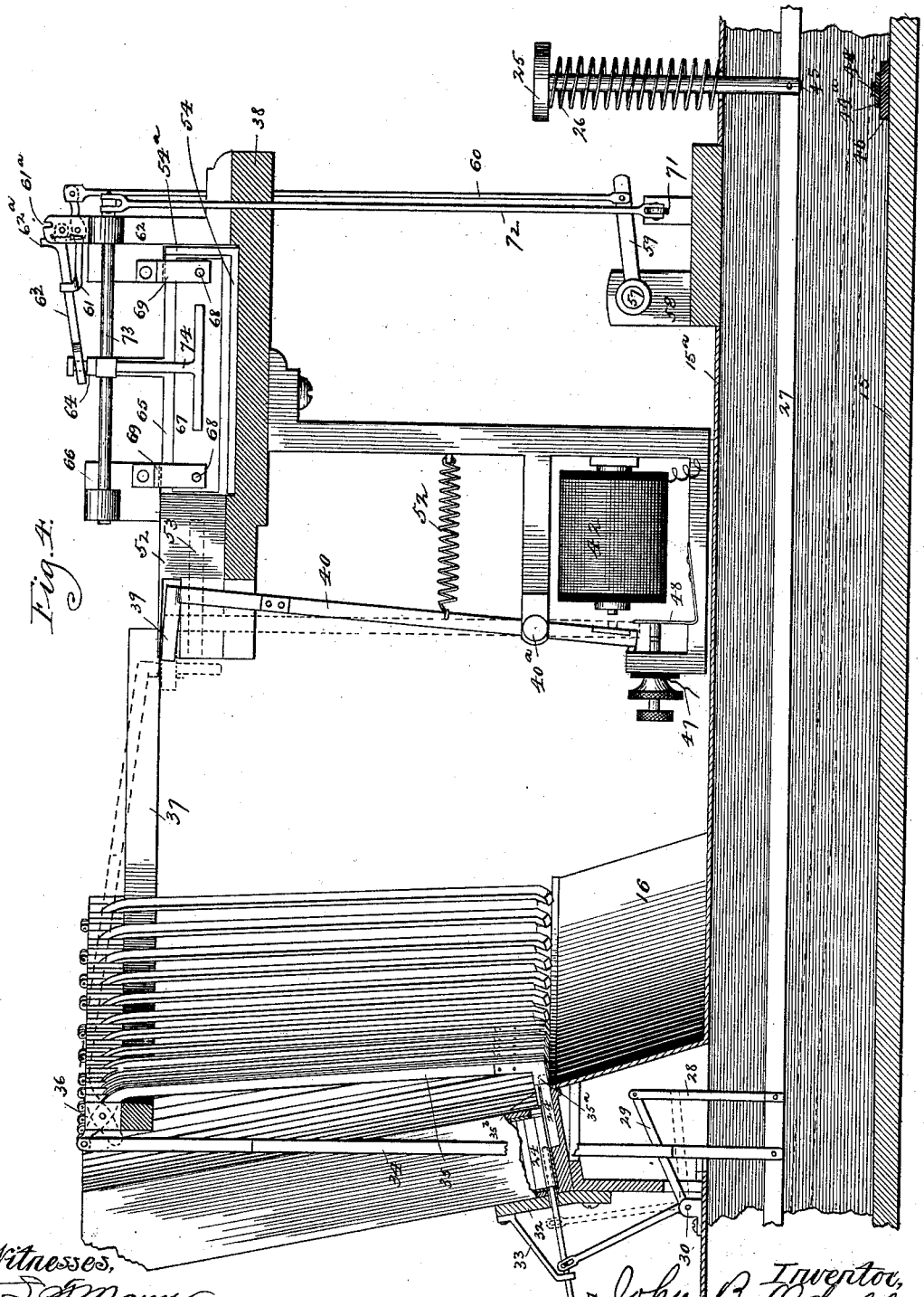
Figure 5:
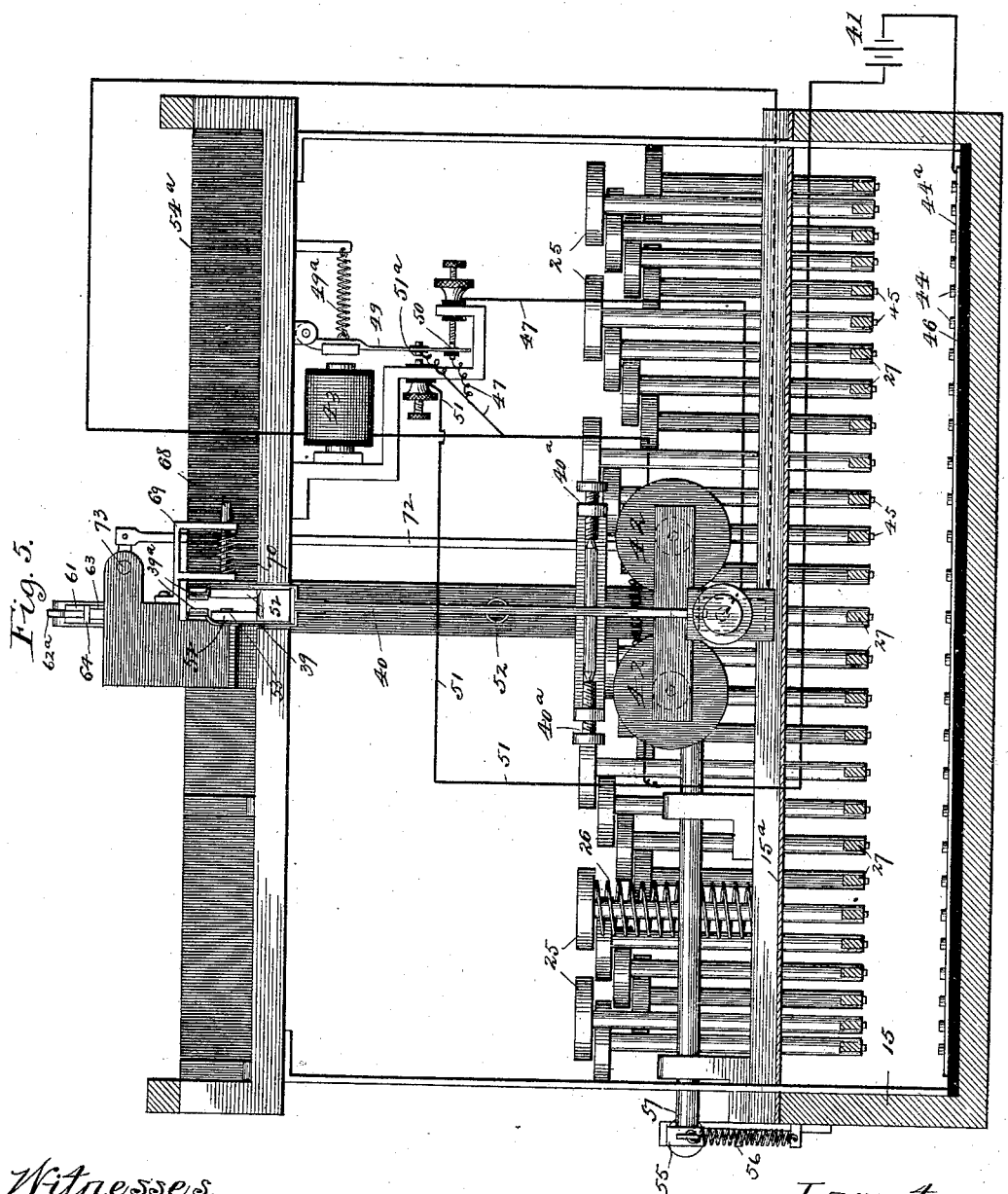
Figure 6:
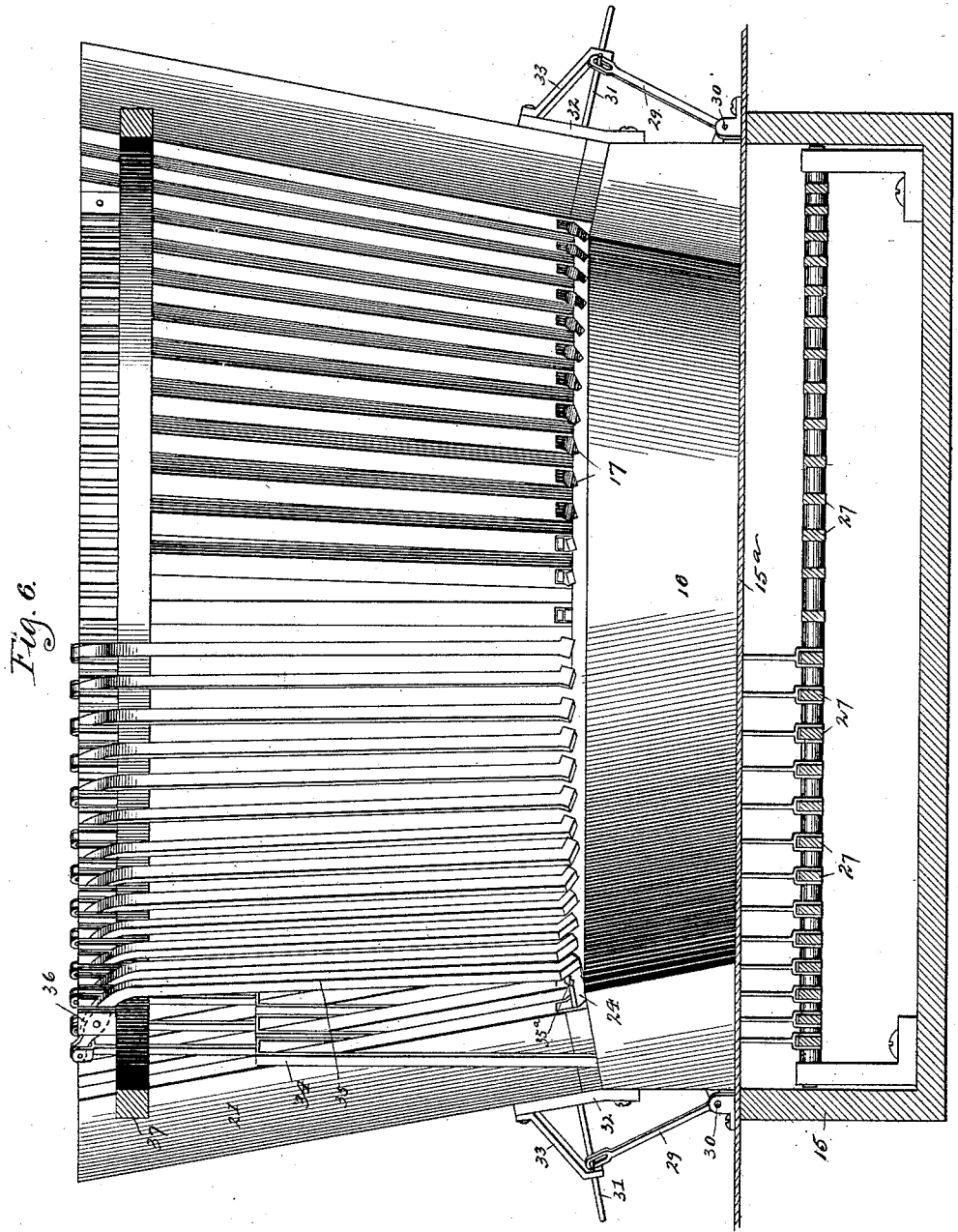

In the accompanying drawings, Figure 1 is a perspective view of the device complete, a part of the frame broken away to expose part of the electrical apparatus. Fig. 2 is a plan view of the central parts of the device, a fragmentary portion omitted from each end thereof. Fig. 3 is a central vertical longitudinal section. Fig. 4 is a section on line 4 4 of Fig. 2. Fig. 5 is a transverse central vertical section looking in the direction indicated by the arrow 5 in Fig. 2. Fig. 6 is a similar view looking in the direction indicated by the arrow 6 in Fig. 2. Figs. 7 to 14, inclusive, are detail views.

In the drawings, 15 represents the base-frame of the structure, on top of which is mounted a circular table 16, having a recess 17 in its top, which preferably slopes toward the rear of the machine. Above this table are a series of type-compartments 18. These compartments are formed by a three-sided frame, (marked 19, Fig. 2,) within which are fitted the type-boxes shown in Figs. 7, 8, and 9. These boxes have three sides 20, which are stationary, and a removable side 21, which projects beyond the end walls of the box, and are adapted to be taken into longitudinal grooves in the end walls of the frame 19. The upper ends of the boxes are open, and a portion of their bottoms and of their front walls at the bottom are cut away, as shown at 22 in the detail Fig. 9. An aperture is also made in the rear wall at 23, through which a plunger is protruded to force the type out of the box. The type 24 are placed in this box, as shown in Fig. 9, each box containing types of the same character. The side 21 will first be removed to facilitate the work, and when the boxes are filled they are slipped into place in the frames 19. The type themselves are ordinary metal type of the usual form, except that they are provided with the recesses $24^a$, Fig. 12, to adapt them to be grasped by the gripping-jaws, hereinafter described. They will be so placed that the type-face shall appear at the opening in the front wall of the box.

As shown in Fig. 2, there are twenty-six type-compartments; but it will of course be understood that there will be one for each character used, and that there will be for each type-box a corresponding key. These keys, which are marked 25, are banked at the front of the machine, and are arranged, preferably, as in the ordinary type-writer. Each key, of which the one shown in Fig. 4 is representative, has its stem vertically movable in an aperture in the top of the base 15, and spring 26 is interposed between the head of the key and the top of the base, whereby the key is yieldingly sustained in its normal position. The stems of the keys are pivotally secured within the hollow of the base to the ends of horizontal levers 27, the opposite ends of which are pivoted near the rear of the base, Fig. 3. Two systems of levers are connected with the key-levers 27, one of which operates the plungers for forcing the type out of the boxes, and the other operates the levers that carry the type to the point where they are assembled in the line. The first of these systems comprises the straight link 28, pivotally connected to a bent lever 29, which rocks on the pivot 30, and which has a slot-and-pin connection with a horizontal moving plunger 31, which latter has a bearing toward its inner end in a plate 32 and at its outer end in a bracket 33, projected from said plate. The type feed down by gravity, and the lower one is sustained on the bottom of the box opposite the aperture 23, through which the end of the plunger passes when its key is depressed, thus striking the lower type and forcing it forward until it clears the uncut portion of the box-bottom, when it drops into the recess 17 of the table 16. The other system of levers comprises the straight vertically-working link 34, pivotally connected at its lower end to the lever 27 and at its upper end to the bent end of a type-carrying lever 35, pivoted in ear-pieces 36 on a yoke 37, supported by a table 38, or in any other convenient manner. Levers 35 are armed at their lower ends with spring-jaws 35$^a$, having suitable points to enter the recesses 24$^a$ of the type, as shown in Fig. 14, and a plate 35$^b$ to sustain the type in position.

In order to present the type properly to the device which removes them from the spring-jaws of the levers 35, it is necessary that the latter shall be so arranged as to deliver them at a common point, which is indicated by the dotted lines in Fig. 4, and it is also necessary that the type shall be presented in the same relative position at that point. To accomplish the first of these objects, the type boxes or compartments are arranged in the arc of a circle, and the levers 35 are arranged concentrically to the type-boxes, so as to present each type at the proper point. In order that the type may be brought up in proper relative position—that is, so as to face the same way—it is evident that the gripping-jaws of levers 35 will have to be so disposed as to compensate for their varying positions. This is provided for by bending the lower ends of said arms at angles more or less acute, depending upon their distance from a central position, and by making the recesses 17 of the table 16 of such form as to hold the type in the corresponding angular position. This arrangement is clearly shown in Fig. 6, where a recess at the center of the view has its bottom in a horizontal plane, while the recess at the right of it has its bottom in a plane at an angle to the horizontal, and the next one and the succeeding ones are still more inclined. At the left of the center the recesses are also inclined in the same degree, but at the reverse angle. The lower ends of the carrying-levers 35 will be so disposed as to correspond with the position of the type in these recesses—that is to say, the center lever will have its gripping-jaws at right angles to it, as indicated in Fig. 13, while the levers on either side thereof will have their gripping-jaws more or less inclined, as described in the two views 10 and 11.

The mechanism for receiving the type from the carrying-levers 35 and transferring them to their proper position in line comprises a pair of spring-jaws 39, which are carried upon the pivoted lever 40, actuated by certain electrical devices. These spring-jaws 39 have their shanks secured on the sides of the levers 40, as clearly shown in Fig. 15 and also Figs. 3, 4, and 5. These jaws are bent at right angles upwardly from the upper end of the lever 40, then again at right angles and extending vertically to a point above the middle of the height of the line, and then their ends are again bent so as to bring the upper part of the springs flush with the walls of the guideway. By this means there are formed on the upper ends of said spring-jaws two lips 39$^a$, cam-faced toward the rear of the machine, whereby they are adapted to pass over the type when forced outwardly against it and then closing behind the type operatively to withdraw it from the jaws of the carrying-levers 35 and transfer it to its position in the line.

In Fig. 4 the type-lever 35 is shown in its elevated position with the type extended, ready to be drawn into place by the jaws 39, and the latter are shown in front of the type, while their position after having been forced over the type is indicated by dotted lines in said figure.

In Fig. 2 the line of type is shown partially completed, the spring-jaws 39 being shown with their lips behind the last type which has just been placed in the line. Lever 40 is actuated by electrical means, which comprise the battery 41, Fig. 5, the magnets 42, the magnets 43, suitable circuit connecting the magnets and battery, a series of contact-points located beneath the keys 25, and other auxiliary devices, whereby the depressing of any key operates, as before described, to carry a type to a position from which it is to be transferred to the line and at the same time eject another type from the box, and, finally, by means of said electrical devices, said type is taken from the carrying-lever and transferred.

44 represents metallic points corresponding in number and location to the various keys, each of which is provided at the lower end of its stem with a metallic pin 45. The points 44 may project from a brass plate 44$^a$, which is insulated by the strip 46, and the plate 44$^a$, connected with one side of a battery. The other side of the battery is connected to one side of the magnets 42, and through them to the magnets 43, and from thence to the base-plate 15$^a$, which is in electrical contact with the entire bank of keys through the springs 26. With this arrangement it is obvious that the circuit is completed by the depression of any one of the keys until it impinges on one of the points 44. A shunt-circuit (represented by the lines 47) is thrown around the magnets 43, so that said magnets cannot be brought into the circuit until the armature-lever 40 of the magnets 42 engages a spring 48, which opens the shunt-circuit, allowing the current to pass through the magnets 43, thus drawing its armature 49 away from the point 50, further opening the said shunt-circuit to prevent its shunting the magnets 43 on the return of the armature of the magnets 42 until the key is released. As the armature-lever of magnets 43 is drawn forward it closes a shunt-circuit formed by the wires 51 around the magnets 42 at the points 51$^a$, allowing the armature 40 to be retracted, under the influence of the spring 52, to its normal position. The armature-lever 49 of the magnets 43 is returned to its normal position by the spring 49$^a$ upon releasing the key. As the armature-lever 49 returns to its normal position, striking the point 50, the magnets 43 are shunted out. With this arrangement of parts the action is as follows: The contact of the points 44 46, caused by depressing the key, first sends the current through the magnets 42, and thereby attracts the armature-bearing lever 40, the upper end of which bears the springs 39. This lever, which is pivoted at 40$^a$, moves with extreme rapidity, and its upper end is thrown backward, and the jaws 39, being forced apart by coming in contact with the type, are closed behind the latter again, as shown in Fig. 2. At the same instant that the lips 39$^a$ are closed behind the type the lower end of the lever 40 strikes the spring contact-point 48, opening the shunt and allowing the current to pass into the magnets 43, and thereby closing the shunt around the magnets 42, which releases the armature-lever 40, the upper end of which is retracted by the spring, thus disengaging the type from the jaws of levers 35 and forcing it into the lineway. The type are carried by the jaws 35$^a$ to a lineway formed by guide-pieces 52, fixed upon the table 38, and between the end of which the type are delivered by the jaws 39. One of the guide-pieces may be provided with a flat spring, (indicated by dotted lines 53 in Fig. 4,) whereby the line of type is pressed against the opposite piece 52 with sufficient force to preserve it from falling. As the line of type is formed, it is pushed along by each accession thereto until finally it extends across the table and rests upon the movable stick 54, which moves in grooves in the top of the table 38. This stick has one upright side wall 54$^a$ and one end wall 54$^b$, and on it the lines are assembled in regular order. The mechanism for moving each line of type out of the way of the newly-formed line comprises a hand-lever 55, one end of which is connected to a spiral spring 56, one end of the spiral spring being secured to the base 15. A rock-shaft 57 is journaled in brackets 58, arising from the top of the base. The outer end of said rock-shaft is rigidly secured to the hand-lever 55. The inner end of shaft 57 has a crank-arm 59, and a link 60 is secured at one end to said arm and at the other is pivotally attached to a short lever 61, pivoted upon part of the frame-work marked 62. The arm 61 is adapted to lift vertically the outer end of a similar arm 63, which is slotted to receive the head of an upright 64, extending from a gate or partition 65, which latter is adapted to slide vertically in ways 66. While the line is being formed upon the stick it is supported upon the one side by the gate 65 and upon the other by a vertical plate 67, secured on the ends of pins 68, said pins fastened through apertures in bracket 69 and adapted to have a limited forward and back movement with the plate. Coiled springs 70, interposed between the brackets and a shoulder on the pins 68, normally hold said plate in line with one of the guide-pieces 52. In order to move the line of type over one space, I have provided the mechanism comprising a lever 71, having a link 72, which is connected at its upper end to the crank of a rock-arm 73, which bears a rigid arm 74, which is adapted to impinge at its lower end upon the outer surface of the plate 67. Now, as the arm 57 is rocked, its crank 59 depresses arm 71, and thereby causes shaft 73 to rock in its bearing and arm 74 to force plate 67 inwardly, thus forcing the line of type over one space. The first line of type will be formed against the end wall 54$^b$ of the stick, and the movement of said line into place will cause the movement of said stick along the groove a distance equal to the width of the line of type, and as successive lines are formed the stick will be moved along step by step in the same manner. The principal function of the gate is to afford a smooth surface against which to form the line of type, and it will preferably be used whenever self-leading type are employed; but where it is desired for any reason to space the lines by leads the gate will be elevated and held in its elevated position by a pin inserted in the slot 61$^a$ and made to engage the shoulder 62$^a$ on arm 63. Arm 61 is free to work on its pivot, and none of the other parts are disturbed thereby, the movement of the line of type being effected in the same manner as before described.

The complete operation of the machine is as follows: It will be understood that the type-boxes are filled with type, one of each kind being in its recess 17 and grasped by the jaws of the carrying-levers 35. Now, when the type desired has been selected, the key corresponding thereto is depressed, and the lever carrying such type starts to move upward. Simultaneously with the upward movement of the lever 35, bearing its type, another type is ejected from the box by the plunger before described. The type will arrive at the outward limit of its movement simultaneously with the contact between the points 44 and 46, which contact, as before described, first retracts the lower end of the lever 40 and forces its upper end outwardly, the spring-jaws thereon being forced over the type and closing in behind it. At this instant the magnets 42 are cut out of the circuit, and the spiral spring retracts the upper end of the lever 40, thus forcing the type from between the clamping-jaws 35ª and into the way formed by the guide-pieces 52. The release of the key opens the circuit, and when the carrying-lever has fallen again, forcing its jaws over the head of the new type, the cycle is complete and the operation ready to be performed over and over again until the line of type has been lengthened by successive additions, when it is moved over one space by means of the hand-lever 55, and a new line is formed in its place.

Of course modifications of the particular construction herein shown and described may be made within wide limits without departing from the spirit of my invention—as, for example, in the construction and arrangement of the actuating-levers, the forms of the type-boxes, and in the character of the type themselves. A machine of this character is adapted for setting type in ordinary newspaper and book work, and it may be adapted to any desired font of type.

I claim—

1. In a type-setting machine, the combination of a series of type boxes or compartments from which the type are removed one at a time, a series of operating-keys corresponding in arrangement with the type-boxes, a series of type-carrying levers connected with and actuated by the operating-keys and adapted to convey the type from the type-boxes to a common point, a way wherein the type are assembled in line, and means for transferring the type from the type-carrying levers to said way, substantially as described.

2. In a type-setting machine, the combination of a series of type-compartments having apertures to permit the removal of type therefrom, a series of operating-keys having levers connected thereto and to a plunger, a plunger adapted to force the type out of their compartments when the keys are depressed, a way in which the type are assembled, a series of type-carrying levers connected to the key-levers and provided with jaws adapted to grasp the type and deliver them at the way, the pivoted lever having means for taking the type from the carrying-lever jaws and transferring them to the way, and electrical appliances comprising magnets, a battery, and wires, and adapted by the depression of the keys to form a circuit and rock the lever on its pivot and cause its jaws to engage the type, and adapted to return to its normal position when the circuit is opened, and thereby transfer the type to the way, substantially as described.

3. In a type-setting machine, the combination of the type-compartments having apertures to permit the egress of the type, a plunger, operating-keys, levers connecting the plungers and the keys, type-carrying levers, a way in which the line is formed, an electrically-operated transfer-lever adapted to take the type from the carrying-lever and transfer it to the way, a movable stick or frame upon which the line is pushed from the way, and means for moving the stick with the line thereon to permit the formation of a new line, substantially as described.

4. In a type-setting machine, the combination of a series of type-compartments, a table below the latter having recesses therein, into which the type are delivered from the compartments, a series of operating-keys, a plunger, and levers connecting the plungers and keys, type-carrying levers, one for each compartment, connected with the key and adapted to engage the type and carry them to a common point, a pivoted transfer-lever adapted to take the type from the carrying-levers and deliver them in line upon a suitable support, a gate against which the line rests, a plate or follower, and suitable actuating mechanism for the gate and follower, whereby the line is moved out of the way when completed, substantially as described.

5. In a type-setting machine, the combination of type-compartments concentrically arranged upon a suitable base or table having type-recesses therein whose bottom walls incline at varying angles, increasing from the center toward the side of the series, and a series of type-carrying levers having their lower ends bent or inclined to correspond to the position of the type in the recesses, and suitable means for actuating said levers, whereby said levers deliver the type at a common point and in the same relative position, substantially as described.

6. In a type-setting machine, the combination of means for delivering the type at a way, said way in which the type are assembled in line, and means for transferring the type to the way, comprising, in combination, a pivoted lever, one end of which has type-bearing jaws, and the other of which forms the armature of magnets, said magnets and wires connecting them on one side with a battery and the other with a key-board, and contact-points connected with the opposite side of the battery, whereby the depression of the key completes the circuit, and thereby actuates the transfer-lever, substantially as described.

7. In a type-setting machine, means for delivering the type at a way, and a transfer-lever for conveying the type onto said way, the lower end of said lever constituting the armature of a pair of magnets normally in an open circuit, and means for closing the said circuit, comprising keys and insulated contact-point upon which the keys impinge, a second pair of magnets normally shunted out of said circuit by its own armature, and said shunt-circuit adapted to be opened to include said second pair of magnets in the first circuit by the movement of the transfer-lever, a normally-open shunt-circuit around the first pair of magnets and adapted to be closed by the forward movement of the armature-lever of the second pair of magnets, thereby cutting out the first pair of magnets and releasing the transfer-lever, said second pair of magnets remaining in the circuit until said circuit is opened by the release of the key, substantially as described.

JOHN B. ODELL.

Witnessss:
FREDERICK C. GOODWIN,
C. C. LINTHICUM.